US009705586B2

(12) United States Patent
Wang

(10) Patent No.: US 9,705,586 B2
(45) Date of Patent: Jul. 11, 2017

(54) SATELLITE WITH TRANSITION BEAM SIZE

(71) Applicant: SPACE SYSTEMS/LORAL, LLC, Palo Alto, CA (US)

(72) Inventor: Leah Wang, Fremont, CA (US)

(73) Assignee: SPACE SYSTEMS/LORAL, LLC, Palo Alto, CA (US)

( * ) Notice: Subject to any disclaimer, the term of this patent is extended or adjusted under 35 U.S.C. 154(b) by 8 days.

(21) Appl. No.: 14/875,491

(22) Filed: Oct. 5, 2015

(65) Prior Publication Data

US 2017/0099095 A1   Apr. 6, 2017

(51) Int. Cl.
  H04B 7/185   (2006.01)
  H04W 16/28   (2009.01)
  H04W 16/10   (2009.01)

(52) U.S. Cl.
  CPC ............ H04B 7/185 (2013.01); H04W 16/10 (2013.01); H04W 16/28 (2013.01)

(58) Field of Classification Search
  CPC ............ H04B 7/18523; H04B 7/18513; H04B 7/2041; H04H 20/51; H04H 20/74; H04H 40/90; H04H 2201/14; H04N 7/20
  USPC ........... 455/3.03, 12.1, 13.2, 98, 427, 404.1, 455/404.2, 456.1; 701/213; 244/158.1, 244/158.4, 158.6
  See application file for complete search history.

(56) References Cited

U.S. PATENT DOCUMENTS 4,882,588 A * 11/1989 Renshaw .................. H01Q 3/22
                                                    342/354
5,974,316 A * 10/1999 Tayloe ............... H04B 7/18558
                                                    455/12.1
6,173,178 B1   1/2001 Hammill et al.
6,366,256 B1   4/2002 Ramanujam
6,463,282 B2  10/2002 Norin
6,496,682 B2  12/2002 Butte
6,512,920 B1 *  1/2003 Yaoya ................ H04B 7/18541
                                                    455/427

(Continued)

FOREIGN PATENT DOCUMENTS

EP    0910180 A2   4/1999
EP    2632061 A1   8/2013
WO    0141548 A2   6/2001

OTHER PUBLICATIONS

ESA-FMT Technical Report 1: Scenario Definition and Benchmark Assessment, Feb. 4, 2014.

(Continued)

*Primary Examiner* — Dominic Rego
(74) *Attorney, Agent, or Firm* — Vierra Magen Marcus LLP

(57) ABSTRACT

A satellite comprises an antenna system configured to provide a plurality of spot beams including one or more small spot beams illuminating a first region of a coverage area, one or more large spot beams illuminating a second region of the coverage area separate from the first region and one or more intermediate sized spot beams illuminating a transition region of the coverage area that is located between the first region and the second region so that the one or more small spot beams are separated from the one or more large spot beams by the one or more intermediate sized spot beams. The one or more intermediate sized spot beams serve to mitigate C/I for the one or more spot beams.

16 Claims, 13 Drawing Sheets

(56) References Cited

U.S. PATENT DOCUMENTS

| | | | |
|---|---|---|---|
| 6,600,921 B1* | 7/2003 | Pietrusiak | H01Q 1/288 244/158.4 |
| 8,712,321 B1* | 4/2014 | Dankberg | H04B 7/18513 370/316 |
| 9,014,620 B2 | 4/2015 | Dankberg | |
| 9,374,262 B1* | 6/2016 | Cook | H03F 3/189 |
| 2003/0043435 A1* | 3/2003 | Oettinger | H04B 10/1123 398/129 |
| 2003/0203737 A1* | 10/2003 | Jarett | H04B 7/2041 455/450 |
| 2004/0242152 A1* | 12/2004 | Jarett | H04B 7/2041 455/12.1 |
| 2004/0248512 A1* | 12/2004 | Munoz | H04B 7/18519 455/12.1 |
| 2006/0014543 A1* | 1/2006 | Drakos | H04B 7/18539 455/450 |
| 2008/0055151 A1* | 3/2008 | Hudson | H04B 7/18515 342/352 |
| 2008/0144734 A1* | 6/2008 | Dankberg | H04B 7/10 375/267 |
| 2008/0181108 A1* | 7/2008 | Hashmi | H04B 7/18513 370/231 |
| 2008/0268775 A1* | 10/2008 | Bishop | H04B 7/0617 455/13.3 |
| 2009/0042562 A1* | 2/2009 | Treesh | H04B 7/2041 455/428 |
| 2009/0096857 A1* | 4/2009 | Frisco | H04B 7/18508 348/14.02 |
| 2009/0232046 A1 | 9/2009 | Fenech et al. | |
| 2010/0315949 A1* | 12/2010 | Agarwal | H04B 7/18515 370/235 |
| 2011/0075601 A1* | 3/2011 | Zheng | H04B 7/086 370/316 |
| 2012/0252356 A1* | 10/2012 | Lance | H04B 7/2041 455/12.1 |
| 2013/0009809 A1* | 1/2013 | Bert | H04B 7/2041 342/354 |
| 2013/0070666 A1* | 3/2013 | Miller | H04B 7/212 370/326 |
| 2013/0154874 A1* | 6/2013 | Burr | H01Q 25/007 342/188 |
| 2013/0197860 A1* | 8/2013 | Gutt | G01C 15/00 702/152 |
| 2013/0303080 A1* | 11/2013 | Moreno | H04J 11/004 455/9 |
| 2014/0228036 A1* | 8/2014 | Feria | H04W 16/02 455/447 |
| 2014/0241239 A1* | 8/2014 | Chang | H04B 7/18506 370/316 |
| 2014/0266870 A1* | 9/2014 | Koduru | H01Q 3/40 342/354 |
| 2015/0189379 A1* | 7/2015 | Swenson | H04N 21/814 725/16 |
| 2016/0277990 A1* | 9/2016 | Chan | H04W 36/30 |
| 2016/0320174 A1* | 11/2016 | Geswender | G01B 11/00 |

OTHER PUBLICATIONS

Ipstar Broadband Satellite Fact Sheet, www.ipstar.com, 2011.

Rinaldo, et al., "Capacity analysis and system optimization for the forward link of multi-beam satellite broadband systems exploiting adaptive coding and modulation," International Journal of Satellite Communications and Networking, 2004.

International Search Report and Written Opinion dated Dec. 20, 2016 in International Patent Application No. PCT/US2016/055262, 11 pages.

* cited by examiner

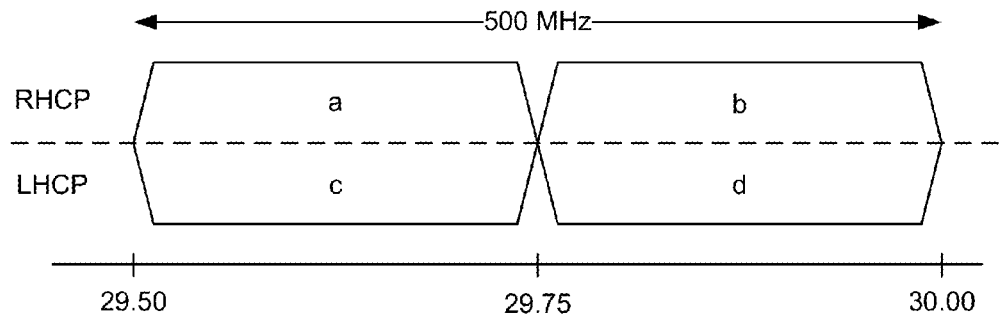
*Figure 2A*
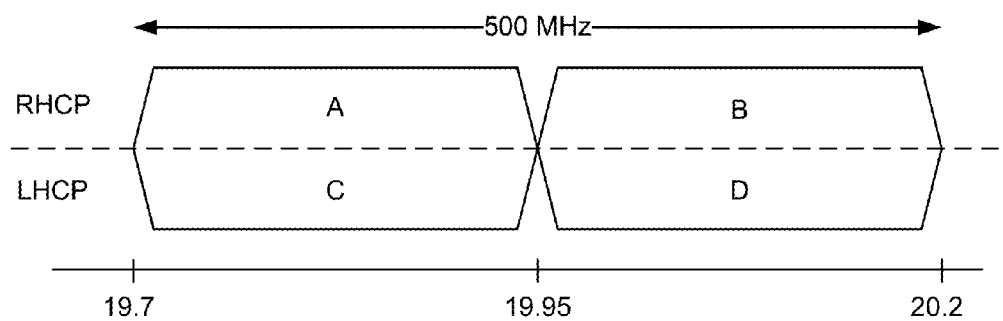
*Figure 2B*
|  | 19.7-19.95 GHz | 19.95-20.2 GHz | 29.5-29.75 GHz | 29.75-30.00 GHz |
|---|---|---|---|---|
| Forward Uplink |  |  | a,c | b,d |
| Forward Downlink | A,C | B,D |  |  |
| Return Uplink |  |  | a,c | b,d |
| Return Downlink | A,C | B,D |  |  |
*Figure 2C*

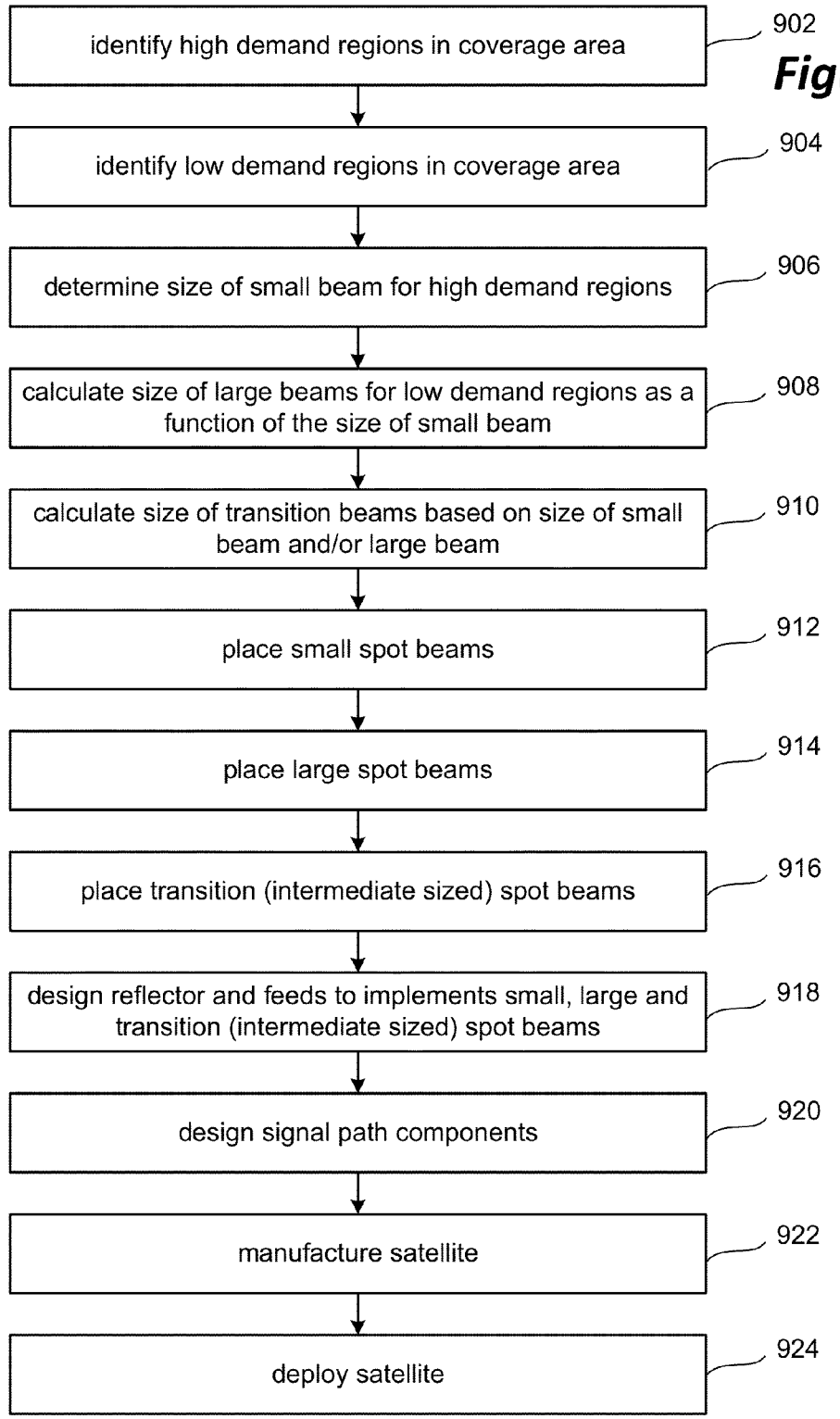

SATELLITE WITH TRANSITION BEAM SIZE

BACKGROUND

Communication satellites typically operate within regulations that allocate at least one operating frequency bandwidth for a particular communications service and specify, among other things, a maximum signal power spectral density (PSD) of communications signals radiated to the ground, etc. A growing market exists for provision of high data rate communication services to individual consumers and small businesses which may be underserved by or unable to afford conventional terrestrial services. To advantageously provide high data rate communication services to such users, a communications platform may provide a high PSD so as to enable the use of low cost subscriber terminals, and efficiently use the licensed bandwidth so as to maximize the communications throughput for a particular licensed bandwidth.

Typically, frequency reuse plans are developed prior to design and deployment of a communication satellite in order to most efficiently service the projected needs of the system. For example, a series of spot beams may be deployed that implement a repeating color re-use pattern, where a color is a unique combination of frequency and polarization. In prior systems, it has been found that some spot beams can be oversubscribed while other spot beams can be underutilized. This situation is not the most effective use of resources.

BRIEF DESCRIPTION OF THE DRAWINGS

FIG. 2A depicts an example uplink frequency plan.

FIG. 2B depicts an example downlink frequency plan.

FIG. 2C is a diagram describing example frequency assignments for uplinks and downlinks using the frequency/polarization combinations of FIGS. 2A and 2B.

FIG. 10 is a flow chart describing one embodiment of a process for manufacturing a satellite.

DETAILED DESCRIPTION

A satellite is proposed that comprises an antenna system configured to provide a plurality of spot beams including one or more small spot beams illuminating a first region of a coverage area that has a high population density (or otherwise has a high demand for services) and one or more large spot beams illuminating a second region of the coverage area that has a lower population density (or otherwise has a lower demand). The a plurality of spot beams also includes one or more intermediate sized spot beams illuminating a third region of the coverage area that is located between the first region and the second region. The one or more intermediate sized spot beams serve to mitigate interference (e.g., C/I) for the one or more small spot beams.

In one embodiment, the plurality of spot beams provide continuous coverage of the coverage area and the large spot beams have a beam size that is a function of a beam size of the small spot beams. In one embodiment, a single aperture of the satellite can communicate small spot beams, large spot beams and intermediate sized spot beams. all in the same color or in different colors.

Figure 1:
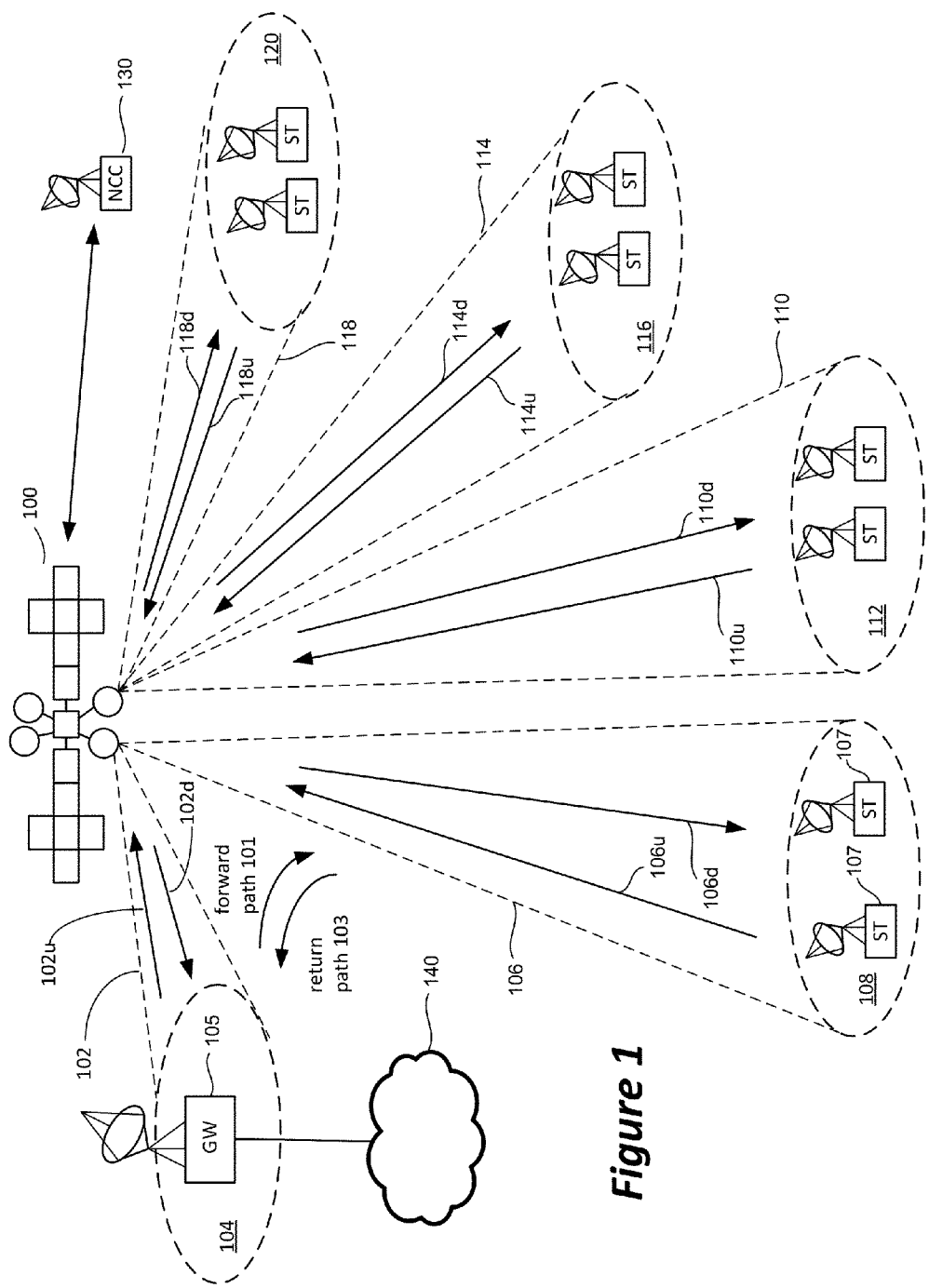
FIG. 1 is a block diagram describing a wireless communications system.

FIG. 1 depicts a block diagram of a wireless communications system that includes a communication platform 100, which may be a satellite located, for example, at a geostationary or non-geostationary orbital location. In other embodiments, other platforms may be used such as UAV or balloon, or even a ship for submerged subscribers. In yet another embodiment, the subscribers may be air vehicles and the platform may be a ship or a truck where the "uplink" and "downlink" in the following paragraphs are reversed in geometric relations. Platform 100 may be communicatively coupled to at least one gateway 105 and a plurality of subscriber terminals ST (including subscriber terminals 107). The term subscriber terminals may be used to refer to a single subscriber terminal or multiple subscriber terminals. A subscriber terminal is adapted for communication with the wireless communication platform including as satellite 120. Subscriber terminals may include fixed and mobile subscriber terminals including, but not limited to, a cellular telephone, wireless handset, a wireless modem, a data transceiver, a paging or position determination receiver, or mobile radio-telephone, or a headend of an isolated local network. A subscriber terminal may be hand-held, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, or a mobile.

In one embodiment, satellite 100 comprises a bus (is spacecraft) and one or more payloads (ie the communication payload). The satellite will also include multiple power sources, such as batteries, solar panels, and one or more propulsion systems, for operating the bus and the payload.

The at least one gateway 105 may be coupled to a network 140 such as, for example, the Internet, terrestrial public switched telephone network, mobile telephone network, or a private server network, etc. Gateway 105 and the satellite (or platform) 100 communicate over a feeder beam 102, which has both a feeder uplink 102u and a feeder downlink 102d. In one embodiment, feeder beam 102 is a spot beam that may operate in an assigned or allocated set of one or more frequency bands (e.g, between 17 and 80 GHz) to illuminate a region 104 on the Earth's surface (or another surface). Gateway 105 is located in region 104 and communicates with satellite 100 via feeder beam 102. Although a single gateway is shown, typical implementations will include many gateways, such as five, ten, or more. Each gateway may utilize its own feeder beam, although more than one gateway can be positioned within a feeder beam. Note that the terms "feeder" beams and "service" beams are used for convenience and are with respect to the nominal direction. Both feeder beams and service beams are spot beams and the terms are not used in a manner to limit the function of any beam.

Subscriber terminals ST and satellite 100 communicate over service beams; for example, FIG. 1 shows service beams 106, 110, 114 and 118 for illuminating regions 108, 112, 116 and 120, respectively. In many embodiments, the communication system will include more than four service beams (e.g., 60, 100, etc.). Each of the service beams have an uplink (106u, 110u, 114u, 118u) and a downlink (106d, 110d, 114d, 118d) for communication between subscriber terminals ST and satellite 100. Although FIG. 1 only shows two subscriber terminals within each region 108, 112, 116 and 120, a typical system may have thousands of subscriber terminals within each region.

In one embodiment, communication within the system of FIG. 1 follows a nominal roundtrip direction whereby data is received by gateway 105 from network 140 (e.g., the Internet) and transmitted over the forward path 101 to a set of subscriber terminals ST. In one example, communication over the forward path 101 comprises transmitting the data from gateway 105 to satellite 100 via uplink 102u of feeder beam 102, through a first signal path on satellite 100, and from satellite 100 to one or more subscriber terminals ST via downlink 106d of service beam 106. Although the above example mentions service beam 106, the example could have used other service beams.

Data can also be sent from the subscriber terminals ST over the return path 103 to gateway 105. In one example, communication over the return path comprises transmitting the data from a subscriber terminal (e.g., subscriber terminal 107 in service beam 106) to satellite 100 via uplink 106u of service beam 106, through a second signal path on satellite 100, and from satellite 100 to gateway 105 via downlink 102d of feeder beam 102. Although the above example uses service beam 106, the example could have used any service beam.

FIG. 1 also shows a Network Control Center 130, which includes an antenna and modem for communicating with satellite 100, as well as one or more processors and data storage units. Network Control Center 130 provides commands to control and operate satellite 100. Network Control Center 130 may also provide commands to any of the gateways and/or subscriber terminals.

The architecture of FIG. 1 is provided by way of example and not limitation. Embodiments of the disclosed technology may be practiced using numerous alternative implementations.

FIG. 2A shows a frequency band allocation in a communications system for a set of uplink signals. FIG. 2B shows a corresponding frequency band allocation in the communications system for a set of downlink signals. A specific example is described for a four color re-use plan. Each color represents a unique combination of frequency band and antenna polarization. In this example, color 'a' represents a first sub-band (29.50 GHz-29.75 GHz) of an allocated uplink frequency band (29.50 GHz-30.00 GHz) with a right-hand circular polarization (RHCP). Color 'b' represents a second sub-band (29.75 GHz-30.00 GHz) of the allocated uplink frequency band with RHCP. Color 'c' represents the first sub-band of the allocated uplink frequency band with a left-hand circular polarization (LHCP). Color 'd' represents the second sub-band of the allocated uplink frequency band with LHCP.

Similarly for the downlink, color 'A' represents a first sub-band (19.70 GHz-19.95 GHz) of the allocated downlink frequency band (19.70 GHz-20.20 GHz) with RHCP. Color B' represents a second sub-band (19.95 GHz-20.20 GHz) of the allocated downlink frequency band with RHCP. Color 'C' represents the first sub-band of the allocated downlink frequency band with LHCP. Color 'D' represents the second sub-band of the allocated downlink frequency band with LHCP. In other embodiments, the colors may include other allocations of the frequency band and polarization.

FIG. 2C is a table showing an example of an allocation of the unique frequency/polarization combinations (colors) to the uplink and downlink signals for feeder beam 102 and the service beams (e.g. 106, 110, 114, 118). The forward uplink (e.g., 102u) and return uplinks (e.g., 106u, 110u, 114u, 118u) share the 29.50 GHz-30.00 GHz spectrum such that colors a-d can be re-used among spot beams as well as between gateway beam and spot beams. Colors 'a' and 'c' in the 29.50 GHz to 29.75 GHz band are colors assigned to spot beams for both forward gateway uplinks and user return uplinks Colors 'b' and 'd' in the 29.75 GHz to 30.00 GHz band are colors assigned to spot beams for both forward gateway uplinks and user return uplinks. In one example, the forward uplinks are used for gateway to satellite communication. If the gateways are geographically isolated from each other and the subscriber terminals, all of the colors 'a'-'d' may be re-used by all of the gateways. If a feeder beam is adjacent to another feeder beam or is adjacent to a service beam, the assignments may be made in such a way that the feeder beam does not use the same color for any beam to which it is adjacent. The return uplinks are used for subscriber terminal to satellite communication in one example. Each service beam may be assigned one or more dedicated colors 'a'-'d.' The assignments may be made such that adjacent service beams do not share the same color.

Similarly, the forward downlinks (e.g., 106d, 110d, 114d, 114d) and return downlinks (e.g., 102d) share the 19.70 GHz-20.20 GHz spectrum such that colors A-D can be re-used between the user forward and gateway return downlinks. Colors 'A' and 'C' in the 19.70 GHz to 19.925 GHz band are colors assigned to spot beams for both user forward downlinks (e.g., subscriber terminals) and gateway return downlinks as well as colors 'B' and 'C' in the 19.975 GHz to 20.20 GHz band. The gateway return downlinks are used for satellite to gateway communication in one example. If the gateways are geographically isolated all of the colors 'A'-'D' may be re-used by all of the gateways. If a feeder beam is adjacent to another feeder beam or is adjacent to a service beam, the assignments may be made in such a way that the feeder beam does not use the same color for any beam to which it is adjacent. The user forward downlinks are used for satellite to subscriber terminal communication in one example. Each user spot beam may be assigned one or more dedicated colors 'A'-'D.' The assignments may be made such that adjacent service beams do not share the same color.

Figure 3A:
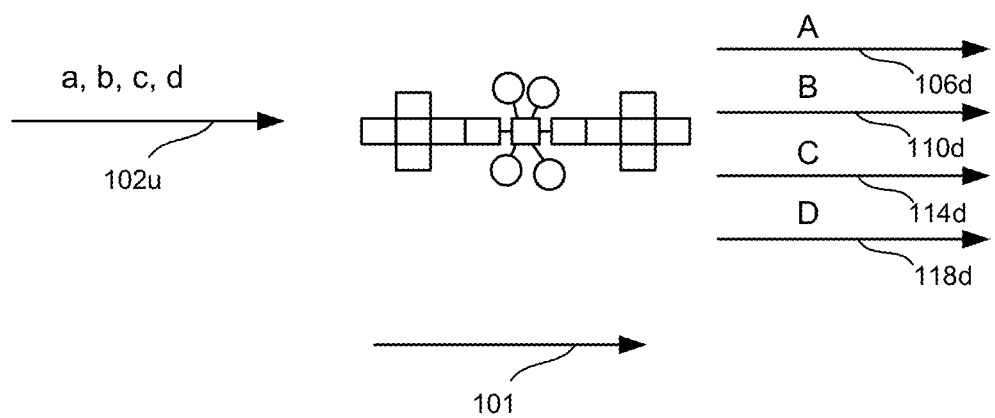
FIG. 3A depicts example assignments of frequency/polarization combinations for one embodiment of a forward path using a satellite.

FIG. 3A shows more details of forward path 101, with respect to the allocation of frequency bands/channels, as discussed above. For the forward gateway uplink (e.g., 102u), data is transmitted from the ground gateway using colors a, b, c and d; routed by satellite 100 to the appropriate set of service beams and then transmitted to the subscriber terminals via the serviced beams. In one example, each service beam only transmits in one color; therefore, one feeder beam transmitting in four colors is paired with four service beams. In the example of FIG. 3A, data transmitted in feeder beam uplink 102u in frequency channel a is routed to service beam 106 for transmission on downlink 106u in frequency channel A; data transmitted in feeder beam uplink 102u in frequency channel b is routed to service beam 110 for transmission on downlink 110u in frequency channel B; data transmitted in feeder beam uplink 102u in frequency channel c is routed to service beam 114 for transmission on downlink 114u in frequency channel C; and data transmitted in feeder beam uplink 102u in frequency channel d is routed to service beam 118 for transmission on downlink 118u in frequency channel D.

Figure 3B:
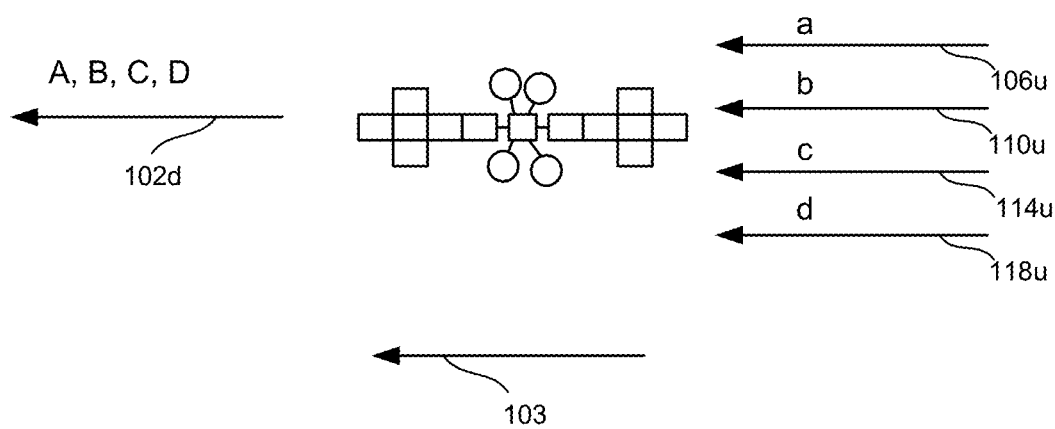
FIG. 3B depicts example assignments of frequency/polarization combinations for one embodiment of a return path using a satellite.

FIG. 3B shows more details of return path 103, with respect to the allocation of frequency bands/channels, as discussed above. Data is transmitted by the subscriber terminals in the uplinks of the service beams using colors a, b, c and d; routed by satellite 100 to feeder beam 102 and transmitted to gateway 100. In this example, each service beams only transmits in one color. In other embodiments, service beams can transmit in more than one color. In the example of FIG. 3B, data is transmitted to satellite 100 in service beam uplink 106u using color a and then transmitted to gateway 105 via downlink 102d using color A; data is transmitted to satellite 100 in service beam uplink 110u using color b and then transmitted to gateway 105 via downlink 102d using color B; data is transmitted to satellite 100 in service beam uplink 1114u using color c and then transmitted to gateway 105 via downlink 102d using color C; data is transmitted to satellite 100 in service beam uplink 118u using color d and then transmitted to gateway 105 via downlink 102d using color D.

Figure 4:
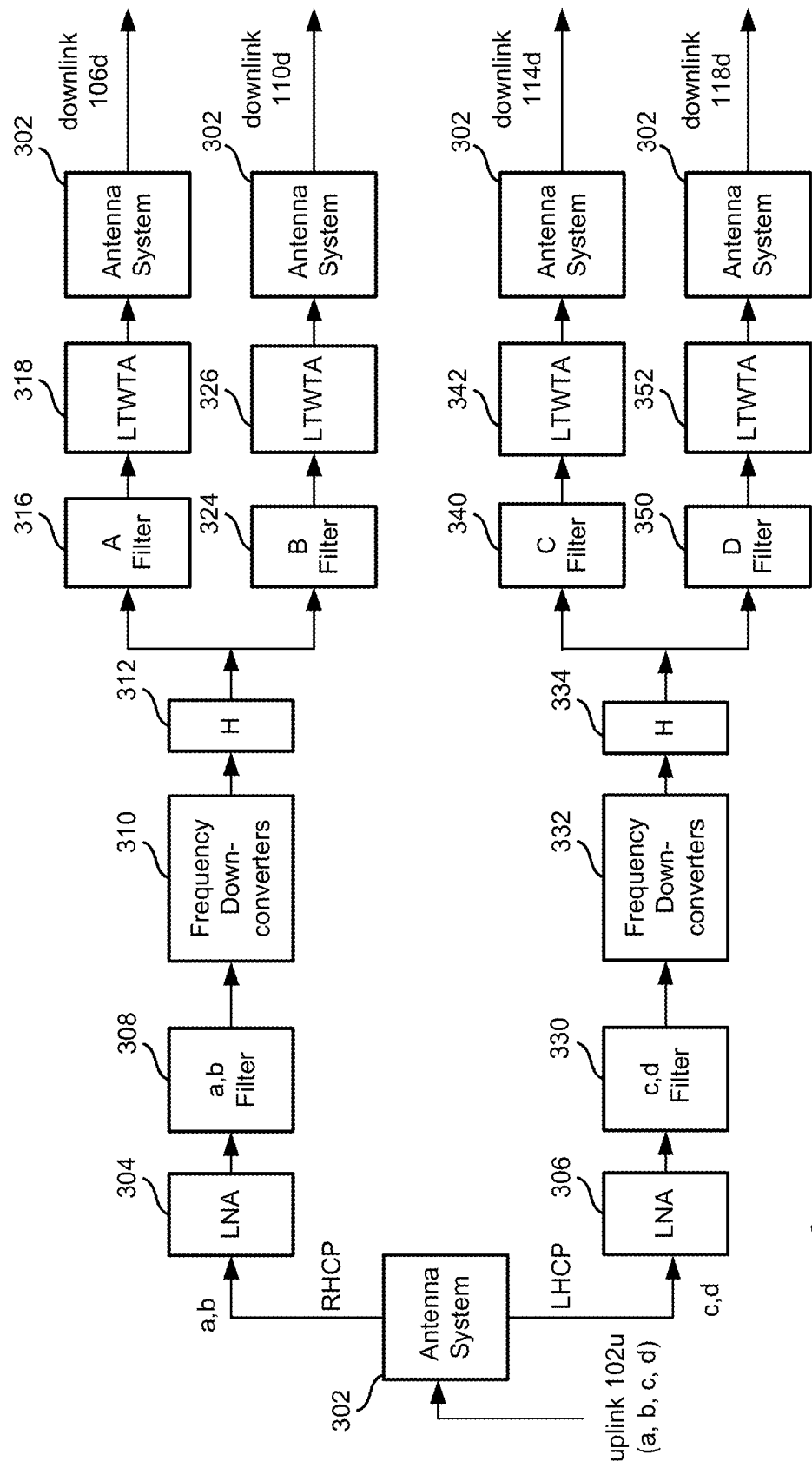
FIG. 4 is a simplified block diagram of example components in a satellite system that can implement one embodiment of a forward path.
Figure 5:
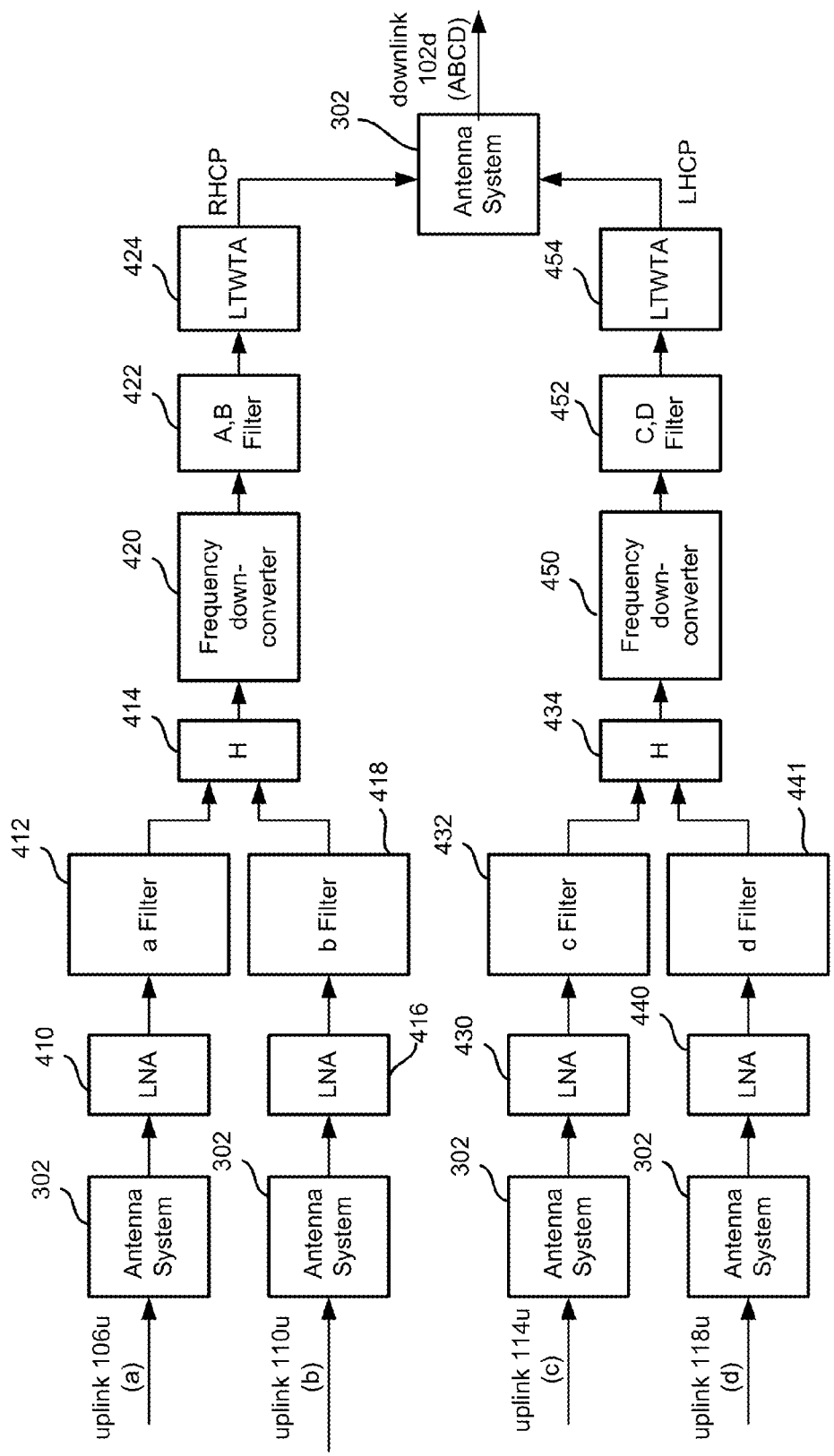
FIG. 5 is a block diagram of example components in a satellite system that can implement one embodiment of a return path.

FIG. 4 is a block diagram describing one embodiment of the components of a first signal path for satellite (or platform) 100. FIG. 5 is a block diagram describing one embodiment of the components of a second signal path for satellite 100. Together, the first signal path of FIG. 4 and the second signal path of FIG. 5 allow communication between gateway 105 of feeder beam 102 and the subscriber terminals of service beams 106/110/114/118. It is contemplated that in a larger satellite system, which includes multiple gateways, the circuits of FIGS. 4 and 5 (or circuits similar thereto) will be replicated many times for multiple pairs of gateways and subscriber terminals.

Looking at FIG. 4, the uplink 102u from gateway 105 (using colors a, b, c, d) are received at the antenna system 302 of satellite 100. As described above with respect to FIGS. 2A, 2B and 2C, a and b are received using right hand circular polarization (RHCP) and c and d are received using left hand circular polarization (LDCP). The signals using colors a and b are provided to low noise amplifier (LNA) 304, while the signals using colors c and d are provided to LNA 306. LNA 304 is used to amplify the signals received in colors a and b. The output of LNA 304 is provided to filter 308. In one embodiment, filter 308 is a band pass filter that allows signals to pass within the frequency bands of colors a and b. The output of filter 308 is provided to frequency down converters 310. Looking back at FIGS. 2A and 2B, the uplink signals of FIG. 2A are at higher frequencies than the downlink signals of FIG. 2B; therefore, uplink signals have to be frequency down converted prior to being transmitted down to the ground. Therefore, the first signal path will include frequency down converters. If the uplink signals are at lower frequencies than the downlink frequencies, then the path would include up converters. Either way, a frequency converter is used. The output frequency of down converter 310 is provided to hybrid 312, which splits the signal into two identical copies: one copy of the signal being transmitted to band pass filter 316 and another copy of the signal being transmitted to band pass filter 324. Band pass filter 316 allows signals to pass within the frequency range of color A. The output of filter 316 is provided to linearized traveling wave tube high power amplifier (LTWTA) 318. The output of high power amplifier 318 is provided to the user link antenna 320, which sends a signal on downlink 106d to subscriber terminals ST. Filter 324 allows signals within the frequency band of color b to pass. The output of filter 324 is provided to LTWTA 326. The output of LTWTA 326 is provided to user link antenna 328 which sends a signal to subscriber terminals ST via downlink 110d.

The output of low noise amplifier 306 is provided to band pass filter 330, which allows signals within the frequency bands of colors c and d to pass. The output of filter 330 is provided to frequency down converter 332. The output of frequency down converter 332 is provided to hybrid 334, which as a splitter. One copy of the input to hybrid 334 is provided to filter 340 and the other copy is provided to filter 350. Filter 340 is a band pass filter that lets frequencies of color C to pass. The output of filter 340 is provided to LTWTA 342. The output of LTWTA 342 is provided to antenna system 302. Filter 350 allows frequencies to pass that are within the frequencies associated with color D. The output of filter 350 is provided LTWTA 352. The output of LTWTA 352 is provided to antenna system 302, which transmits the output signal to downlink 118d. Antenna system 302 transmits its signal on downlink 114d. Antenna system 302 can include one or multiple antennas. Many different types of antennas can be used, and the technology described herein is not limited to any one type of antenna. Examples of antennas include (but are not limited to) reflector antennas, horn antennas, and planar antennas, phased array antennas, all of which are aperture antennas (ie antennas have apertures).

FIG. 5 is a block diagram describing one embodiment of the components of a second signal path on satellite (or platform) 100. The components of FIG. 4 receive data from gateway 105 and provide that data to subscriber terminals ST. On the other hand, the components of FIG. 5 receive data from the subscriber terminals ST and provide that data to gateway 105. Therefore, for one example traditional system, the components of FIG. 4 provide the forward path 101 (see FIG. 1) while the components of FIG. 5 provide the return path 103 (see FIG. 1).

Antennas system 302 receives uplink 106u, which provides data using the frequencies of color a. The signal 106u received at antenna system 302 is provided to LNA 410. The output of LNA 410 is provided to filter 412, which is a band pass filter that allows frequencies to pass within color a. The output of filter 412 is provided to hybrid 414, which is functioning as a directional coupler that combines two signals into one. Antenna system 302 also receives uplink 110u, which provides signals using color b. That signal is provided to LNA 416 which amplifies the signal and sends it to filter 418. In one embodiment, filter 418 is a band pass filter that allows frequencies to pass within the frequency range of color b. The output of filter 418 is provided to hybrid 414, which combines the signals from filters 412 and 418 into one combined signal and provides that combined signal to frequency down converter 420. The output of frequency down converter 420 is provided to filter 422. In one embodiment, filter 422 is a band pass filter that allows frequencies to pass within the bands associated with colors A and B. The output of filter 422 is provided to LTWTA 424. The output of LTWTA 424 is the right hand circular polarization signal to be output by antenna system 302 via downlink 102d using colors A and B.

Antenna system 302 also receives uplink 114u, which communicates data using color c. That signal is provided to LNA 430. The output of LNA 430 is provided to filter 432, which is a band pass filter allowing signals to pass within the frequency range associated with color c. The output of filter 432 is provided to hybrid 434. Antenna system 302 receives uplink 118u which includes data being transmitted in color d. That signal is provided to LNA 440 which amplifies the signal and sends it to filter 441. In one embodiment, filter 441 is a band pass filter that allows signals within the frequency band of color d to pass. The output of filter 441 is provided to hybrid 434. In one embodiment, hybrid 434 is operating as a directional coupler which combines the signals received from filter 432 and filter 441 and provides a combined signal to frequency down converter 450. The output of frequency down converter 450 is provided to band pass filter 452, which allows signals to pass within the frequency ranges of colors C and D. The output of filter 452 is provided to LTWTA 454. The output of LTWTA 454 is sent to antenna system 302 as the left hand circular polarized signal for downlink 102d which includes colors C and D.

Figure 6A:
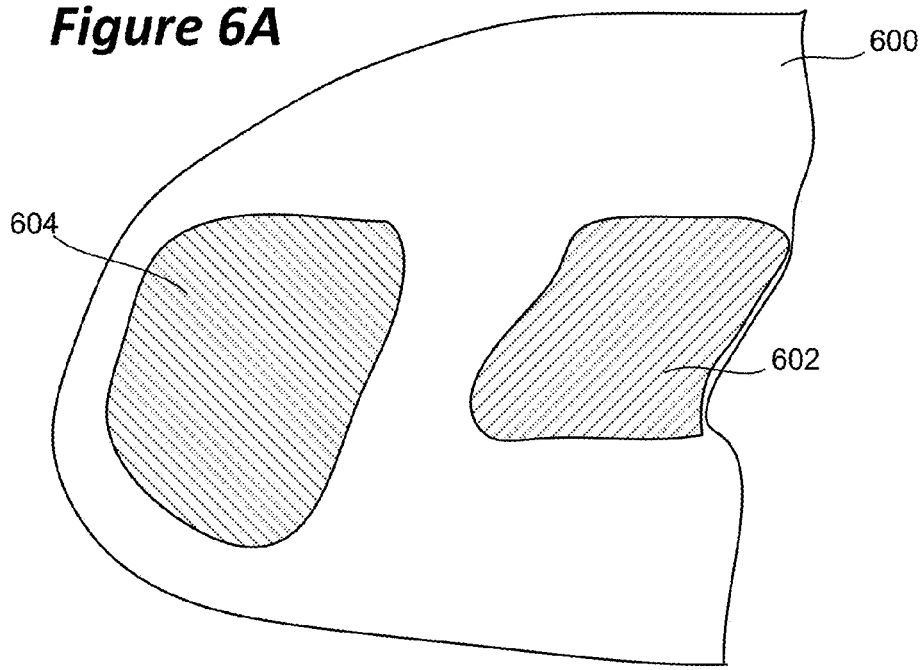
FIG. 6A depicts a coverage area.
Figure 6B:
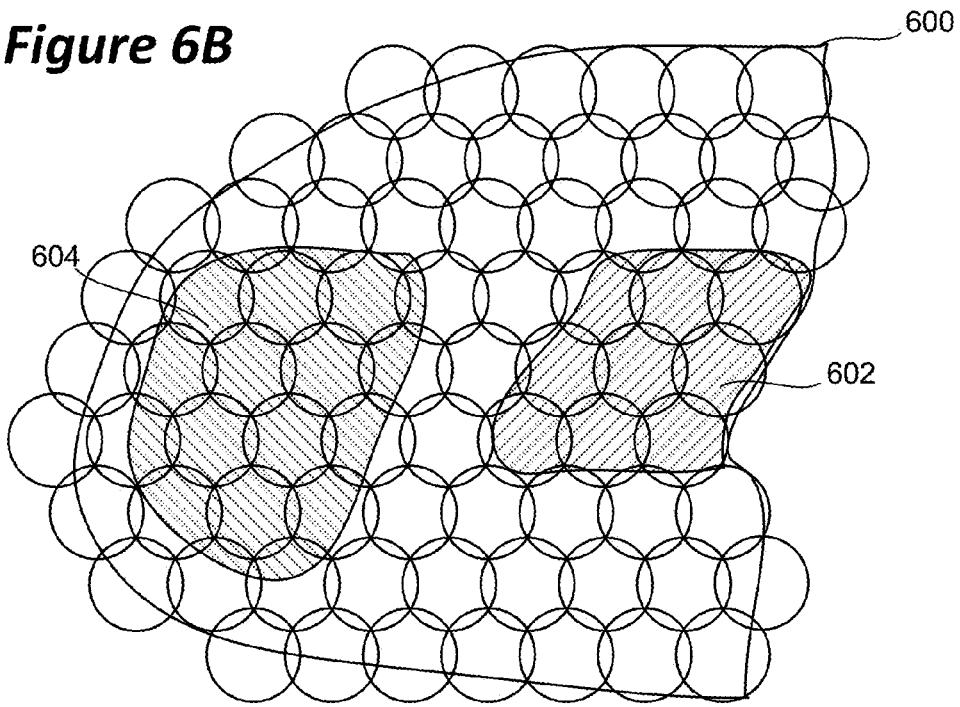
FIG. 6B depicts the coverage area with spot beams.

FIG. 6A depicts an example coverage area 600, which could include any portion of the Earth's surface for which the communication system will provide communication services. For example, coverage area 600 could include one or more countries, a continent, a county, etc. Region 602 of coverage area 600 has a high population density and, therefore, will provide a high demand for services from the communication system. Region 604 of coverage area 600 is a low population density region that will provide a low demand for communication services. The other portions of coverage area 600 are average in population density (or otherwise greater than the low density of region 604 and less than the high density of region 602). One prior strategy for designing a communication system arranged a set of large spot beams across the entire coverage area, as depicted in FIG. 6B. The spot beams depicted in FIG. 6B can implement a frequency reuse system. For example, the four color frequency reuse system described above with respect to FIGS. 2A, 2B and 2C could be implemented such that each of the spot beams uses one uplink color and one downlink color, and these colors are reused throughout the coverage area as described above. The system of FIG. 6B, however, is inefficient because the large spot beams illuminating high population density region 602 will likely be fully subscribed, while the spot beams illuminating low population density region 604 will be undersubscribed. This is an inefficient use of resources.

Figure 6C:
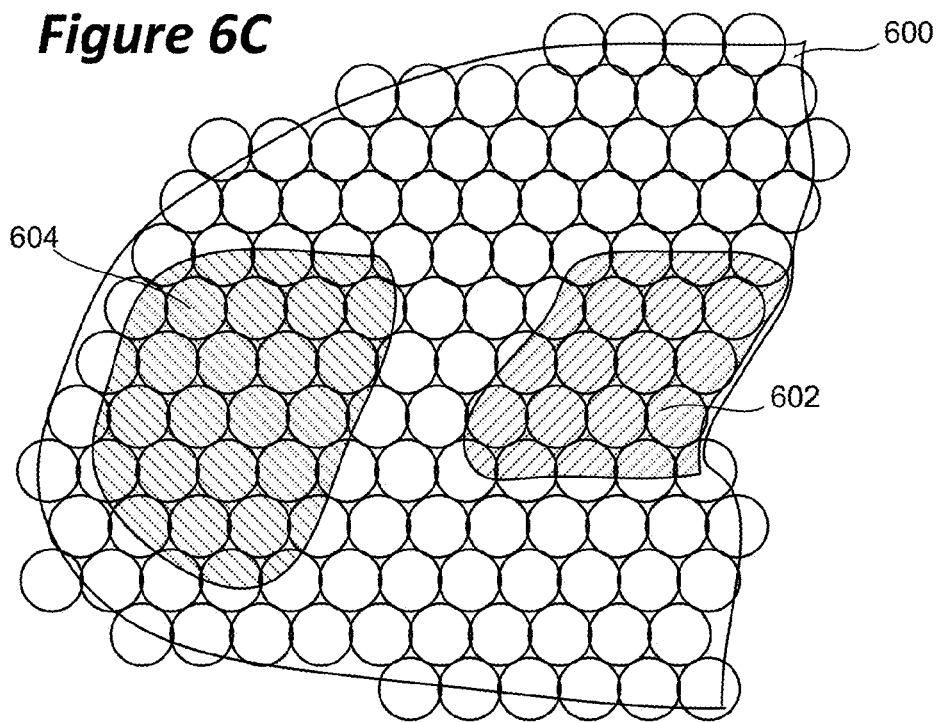
FIG. 6C depicts the coverage area with spot beams.

Another strategy might be to use smaller spot beams, such as depicted in FIG. 6C. The smaller spot beams will better serve and provide more capacity to the high population density region 602; however, the spot beams in low population density region 604 will still be underutilized. Additionally, the use of the smaller spot beams requires more spot beams which increases the cost of the satellite.

Figure 6D:
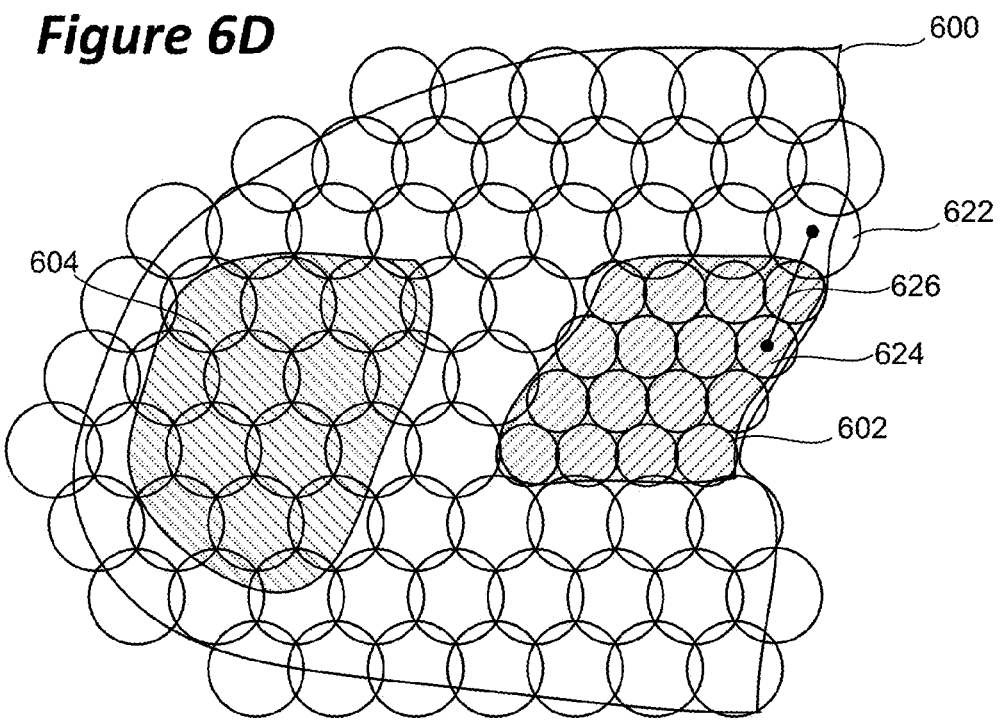
FIG. 6D depicts the coverage area with spot beams.

One potential solution to the inefficiency described above is to use small spot beams over high population density region 602 and large spot beams everywhere else, as depicted in FIG. 6D. This allows high population density region 602 to receive greater bandwidth. The use of small spot beams provides high spectral efficiency and the smaller spot beams can use higher data rates. One problem with the example beam layout of FIG. 6D is interference between beams of the same color. Spot beam 622 is an example a large spot beam. Spot Beam 624 is an example of a small spot beam illuminating a portion of high population density region 602. Line 626 shows the distance from the center of spot beam 622 to the center of spot beam 624. Typically, interference is measured as a signal to interference ratio C/I. As the signal C is the numerator, larger C/I are better than smaller C/I. To keep the C/I to an acceptable level some systems use a rule of thumb that the beam center to beam center distance of two beams using the same color should be no less than 1.5 times the diameter of the larger beam for three color reuse systems and 1.73 times the diameter of the larger beam for four color reuse systems. In the example of FIG. 6D, the distance 626 between the center of beam 622 and beam 624 is too small and would violate the above described rule of thumb for many coverage areas and typical beam sizes employed in the industry.

Figure 6E:
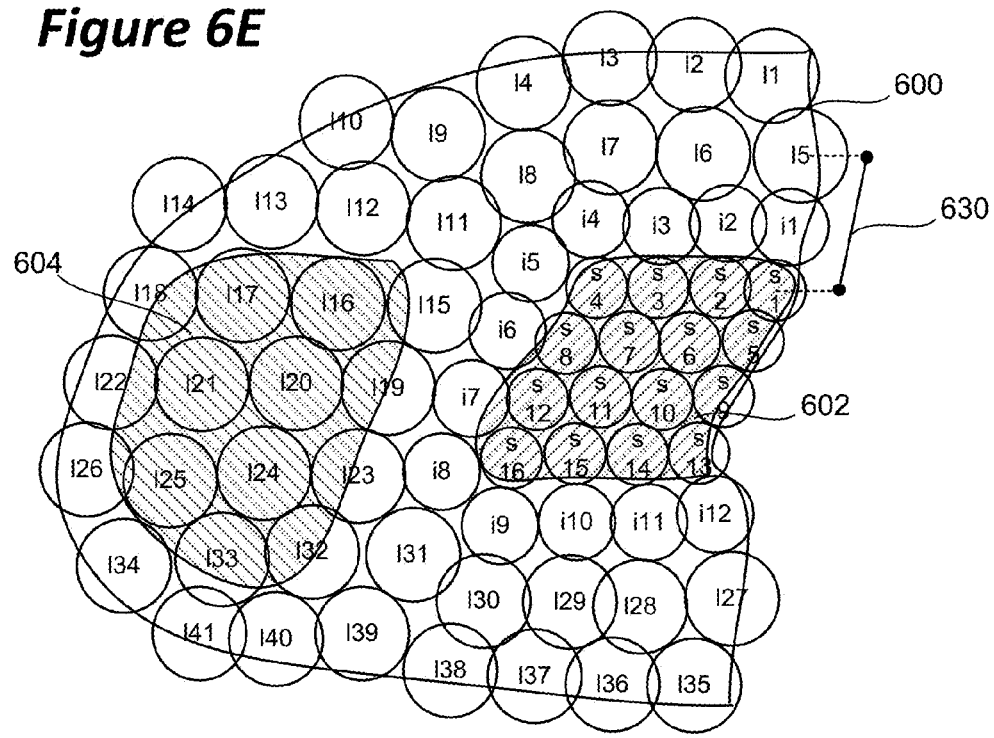
FIG. 6E depicts the coverage area with spot beams.

Therefore, it is proposed to use a transition spot beam between the small spot beams and the large spot beams. Such a system is depicted in the beam map of FIG. 6E which shows a plurality of spot beams including small spot beams illuminating high density region 602 of coverage area 600, large spot beams illuminating a second region of coverage area 600 (where the second region may include low population density region 604 and other regions) and one or more intermediate sized spot beams illuminating a third region (ie, a transition region) of the coverage area 600 that is located between the first region and second region so that the small spot beams are separated from the large spot beams by the intermediate sized spot beams. The intermediate sized spot beams serve to mitigate C/I for the small spot beams. For example, FIG. 6E sows small spot beams s1, s2, s3, s4, s5, s6, s7, s8, s9, s10, s11, s12, s13, s14, s15 and s16. FIG. 6E also shows large spot beams l1, l2, l3, l4, l5, l6, l7, l8, l9, l10, l11, l12, l13, l14, l15, l16, l17, l18, l19, l20, l21, l22, l23, l24, l25, l26, l27, l28, l29, l30, l31, l32, l33, l34, l35, l36, l37, l38, l39, l40 and l41. FIG. 6E also shows intermediate sized spot beams i1, i2, i3, i4, i5, i6, i7, i8, i9, i10, i11 and i12. The portion of coverage area 600 occupied by the intermediate spot beams i1-i12 is the transition region referred to above. The portion of coverage area 600 occupied by the large spot beams l1-l41 is the second region described above. In one embodiment, large spot beam i5 and small spot beam s1 provide communication services using the same color. Line 630 shows the distance between the center of small spot beam s1 and the center of large spot beam l5. This distance 630 is greater than the distance 624 of FIG. 6D. Because large spot beam i5 is further from small spot beam s1, the interference from large spot beam i5 experienced by small spot beam s1 is reduced/mitigated and C/I is at an acceptable level.

The beam map of FIG. 6E provides continuous coverage over coverage area 600. The term "continuous coverage" refers to the fact that there is no gap the service provided by the spot beams in the coverage area. While the circles depicted in FIG. 6E represent spot beams, the exact boundary of the circle is drawn somewhat arbitrarily as the spot beam will provide service outside of the circle drawn. It is known in the art that the further away form a beam center, the more the signal quality may degrade; however, based on interference from other sources and power levels used, service can still be provided. Therefore, small gaps between circles in the beam map of FIG. 6E do not represent gaps in service. Rather, a gap in service would be depicted by an area that has room for another spot beam but does not have a spot beam because no service is being provided.

FIG. 6E shows one row of intermediate spot beams between the large spot beams and the small spot beams. Other embodiments can use more than one row of intermediate sized spot beams. Additionally, coverage area 600 is one example being used to introduce the concepts proposed herein. The proposed technology works with other shaped coverage areas and other beam maps, including beams maps that have intermediate sized spot beams completely or partially surround the small spot beams, and beams maps that have large spot beams completely or partially surround the intermediate sized spot beams and small spot beams.

Figure 6F:
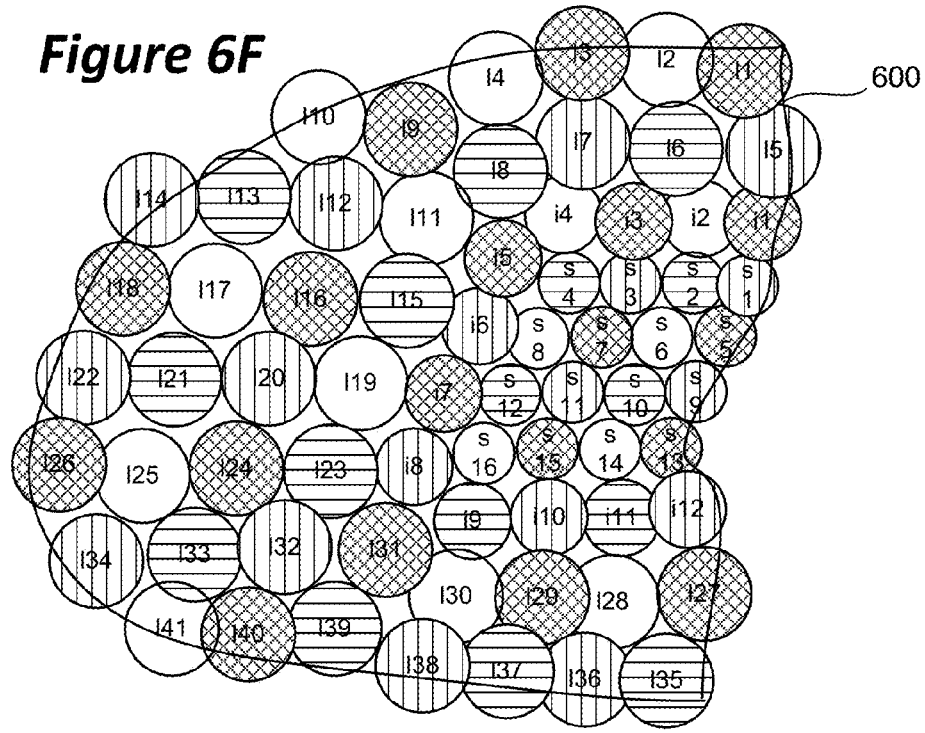
FIG. 6F depicts the coverage area with spot beams.

FIG. 6F shows the same beam map as FIG. 6E over coverage area 600. However, high population density region 602 and low population density region 604 are not depicted to make the drawing easier to read. Additionally, each of the spot beams are shaded in order to indicate color (frequency and polarization). The example of FIG. 6F employs four color frequency reuse. Spot beams are shaded one of four different types of shading to indicate which of the four colors. For example, crisscross shading could reflect color A, blank shading could reflect color B, vertical shading could reflect color C and horizontal shading could reflect color D (see FIG. 2B). Other assignments of color to shading could also be used. The spot beams that include crisscross shading (color A) include spot beams l1, l5, l9, l16, l18, l24, l31, l27, l29, l26, l40, i1, i3, i5, i7, s5, s7, s13 and s15. The spot beams that include blank shading (color B) include spot beams l2, l4, l10, l11, l17, l19, l25, l28, l30, l41, i2, i4, s6, s8, s14 and s16. The spot beams of vertical shading (color C) include spot beams l5, l7, l112, l14, l115, l20, l22, l32, l34, l36, l38, s1, s3, s9, s11, i6, i8, i10 and i12. The spot beams with horizontal shading (color D) include spot beams l6, l8, l113, l115, l21, l23, l35, l37, l39, i9, i11, s2, s4, s10 and s12.

Figure 7:
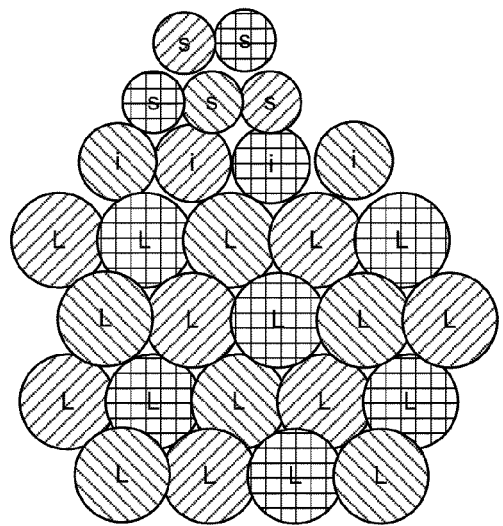
FIG. 7 depicts a beam pattern.

The use of a four color reuse pattern depicted in FIG. 6F is only one example. The technologies described herein can also be used with a three color reuse pattern or a different number of colors. FIG. 7 provides one example of a set of spot beams implementing a three color reuse pattern in a configuration that includes small spot beams, large spot breams and intermediate size spot beams, with intermediate sized spot beams being located between the small spot beams and the large spot beams. For example, FIG. 7 shows small spot beams s, large spot beams L, and intermediate spot beams i. The spot beams are shaded to indicate the three colors. The first color is indicated with both horizontal and vertical lines. (i.e., like a checkerboard). The second color is indicated with diagonal lines going from left upward towards right. The third color is indicated by diagonal lines going from left downward towards the right. The use of the intermediate spot beams i between the small spot beams s and the large spot beams L allow for a larger distance between small spot beams s and large spot beams L of the same color in order to mitigate C/I.

This embodiments described above uses spot beams at three different sizes. The smallest beam size is used in high demand areas, the largest beam size is used in low demand areas, and the intermediate beam size is used in the transition region between the largest and smallest beam sizes. In one embodiment, the 3-beam size beam layout can be realized by a single antenna aperture (or single set of antenna apertures) if the largest beam size to smallest beam size ratio is within 1.5. In other embodiments, greater than 4-color re-use can be used and/or more than three beam sizes can be employed and/or more than one set of aperture can be used.

Figure 8:
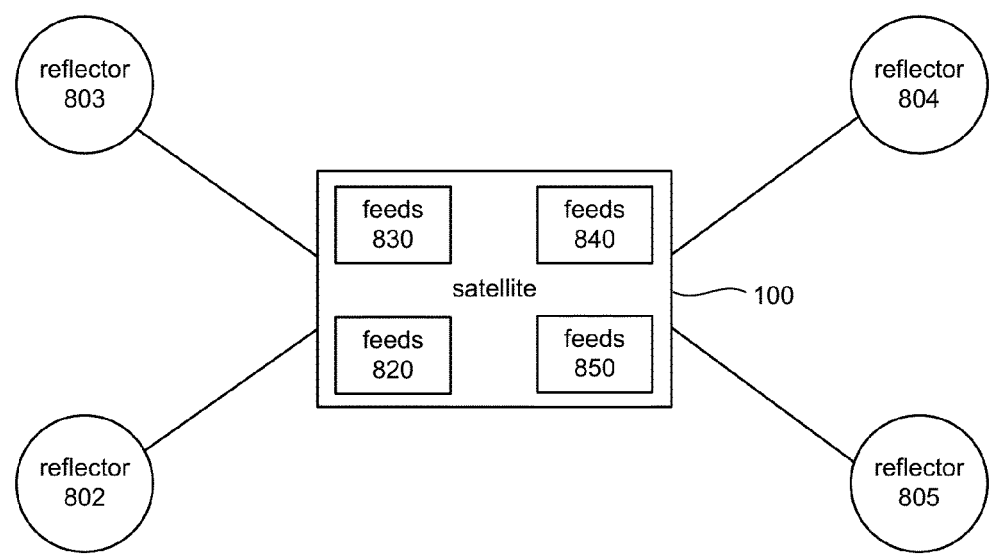
FIG. 8 is a block diagram depicting an antenna system.

FIG. 8 is a block diagram depicting the antenna system for satellite 100. In one embodiment, the antenna system includes four sets of feed horns 820, 830, 840 and 850 as well as four reflectors 802, 803, 804 and 805. Feed horns 820 project onto and receive from reflector 803. Feed horns 830 project signals to and receive signals from reflector 803. Feed horns 840 project signals to and receive signals from reflector 804. Feed horns 850 project signals to and receive signals from reflector 805. Satellite 100 includes a set of signal paths (as described above) between the various feed horns. In one embodiment, each reflector and its associated feed horns transmit in a single color for a particular direction. For example, reflector 802 and feed horns 820 can be used for spot beams that communicate using color A (downlink) and color a (uplink), reflector 803 and feed horns 830 can be used for spot beams that communicate using colors B (downlink) and b (uplink), reflector 804 and feed horns 840 can be used for spot beams that communicate using color C (downlink) and color c (uplink), and reflector 805 and feed horns 850 can be used for spot beams that communicate using color D (downlink) and color d (uplink). In other embodiments, a reflector and/or its associated feed horns can be used to communicate using multiple colors. In one embodiment, the feed horns for a particular reflector will include feed horns to implement small spot beams, feed horns to implement large spot beams and feed horns to implement intermediate size spot beams, all for the same color. Thus each reflector communicates multiple small spot beams, multiple large spot beams and multiple intermediate size spot beams communicating in the same color. In other embodiment, feed horns for a reflector will implement small, intermediate and large spot beams for different colors.

In one embodiment, each of the reflectors are said to be an aperture. Other types of antennas can also be an aperture. Many kinds of pay load antennas, namely reflector antennas, horn antennas and plain antennas, belong to the family of aperture antennas. An aperture antenna is one for which a plane can be defined in which the tangential electric or magnetic field strength distribution is known or can be well estimated; the field is significant over only a finite area in this plane, and this finite area is the aperture. For a reflector antenna with a main reflector which is the surface of revolution of a two-dimensional curve, the aperture is the flat circular area that would close off the reflective surface. The aperture is perpendicular to the curve's axis of revolution. When the main reflector surface is just part of such a symmetrical service, the aperture is the projection of the reflector service onto the same flat circular area. For a horn, it is the radiating opening. For a plain or array, it is the part of the plain containing the array. The aperture's tangential electric field determines the electric field everywhere in the half space in front of the aperture, and the aperture's tangential magnetic field determines the magnetic field everywhere there.

In light of the above, it is said that the example of FIG. 8 includes four apertures. That is each reflector is an aperture. Each aperture transmits in a different color for the four color frequency reuse implementation. Each aperture is configured to provide a plurality of spot beams including one or more small spot beams, one or more large spot beams and one or more intermediate spot beams, all in the same color. Intermediate spot beams are positioned between the small spot beams and the large spot beams. The small spot beams illuminate a first portion of a first region of a coverage area. The large spot beams illuminate a portion of a second region of the coverage area. The intermediate size spot beams illuminate a third region of the coverage area that is located between the first region and the second region.

Figure 9A:
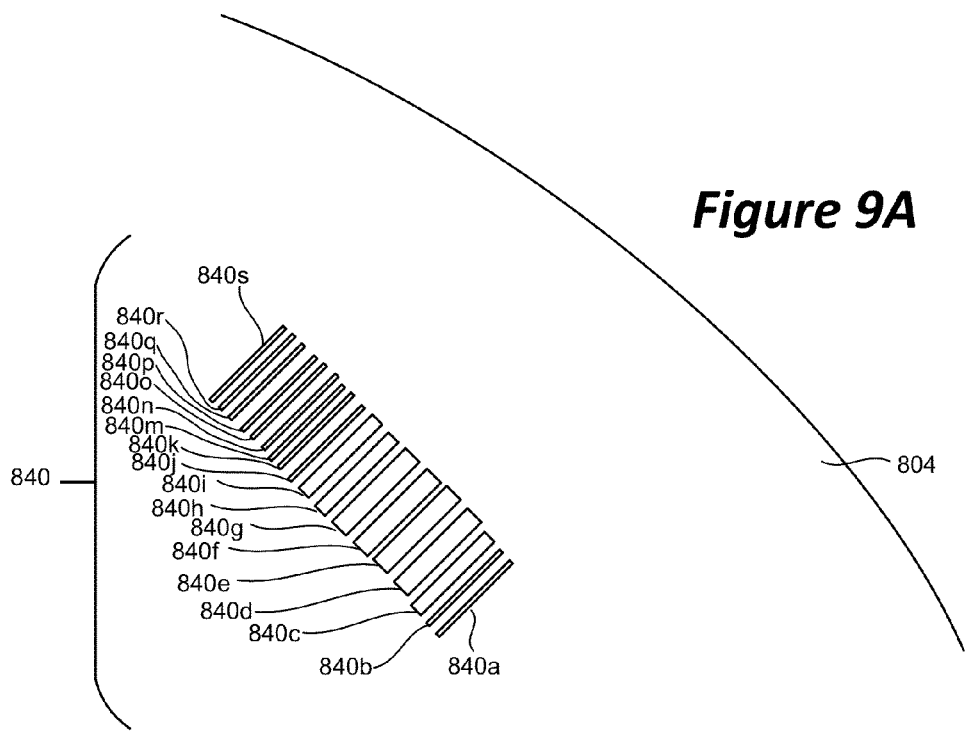
FIG. 9A is a block diagram that depicts a reflector and feed horns.

FIGS. 9A, 9B, 9C and 9D provide more details of each aperture. FIG. 9A shows reflector 804 and feed horns 840. In one embodiment, feed horns 840 include 19 feed horns: 840*a*, 840*b*, 840*c*, 840*d*, 840*e*, 840*f*, 840*g*, 840*h*, 840*i*, 840*j*, 840*k*, 840*m*, 840*n*, 840*o*, 840*p*, 840*q*, 840*r* and 840*s*. Feed horns 840*a*A, 840*b*, 840*j*, 840*k*, 840*m*, 840*n*, 840*o*, 840*p*, 840*q*, 840*r* and 840*s* implement large spot beams. Feed horns 840*d*, 840*e*, 840*f* and 840*g* implement small spot beams, Feed horns 840*c*, 840*h* and 840*i* implement intermediate size spot beams. When transmitting, the feed horns 840 bounce their signal off reflector 804 and down to the ground. When receiving, signals from the ground are bounced off of reflector 804 into the feed horns 840. In one embodiment, all of the spot beams implemented by feed horns 840 communicate in the same color.

Figure 9B:
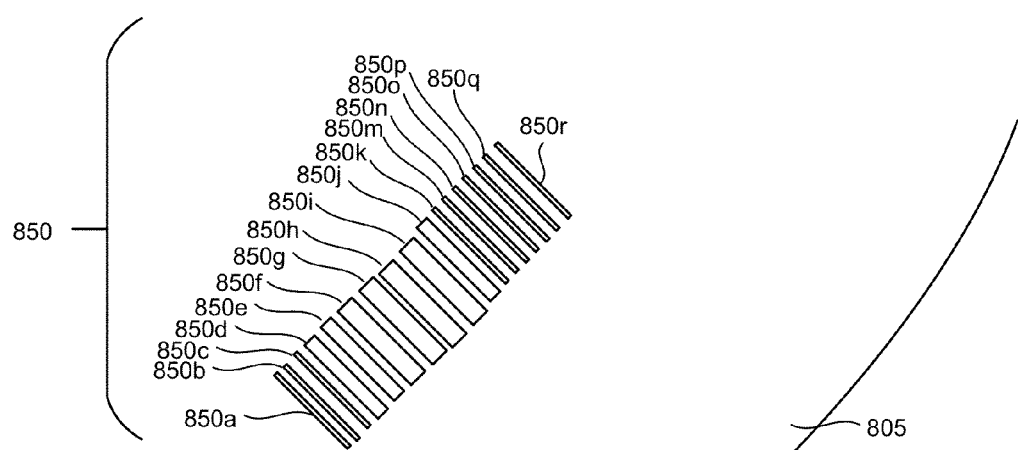
FIG. 9B is a block diagram that depicts a reflector and feed horns.

FIG. 9B shows reflector 805 and feed horns 850. In one embodiment, feed horns 850 include feed horns 850*a*, 850*b*, 850*c*, 850*d*, 850*e*, 850*f*, 850*g*, 850*h*, 850*i*, 850*j*, 850*k*, 850*m*, 850*n*, 850*o*, 850*p*, 850*q*, and 850*r*. Feed horns 850*a*, 850*b*, 850*c*, 850*k*, 850*m*, 850*n*, 850*o*, 850*p*, 850*q*, and 850*r* are used to implement large spot beams. Feed horns 850*f*, 850*g*, 850*h* and 850*i* are used to implement small spot beams. Feed horns 850*d*, 850*e* and 850*j* are used to implement intermediate sized spot beams. When transmitting, the feed horns 850 bounce their signal off reflector 805 and down to the ground. When receiving, signals from the ground are bounced off of reflector 805 into the feed horns 850. In one embodiment, all of the spot beams implemented by feed horns 850 communicate in the same color.

Figure 9C:
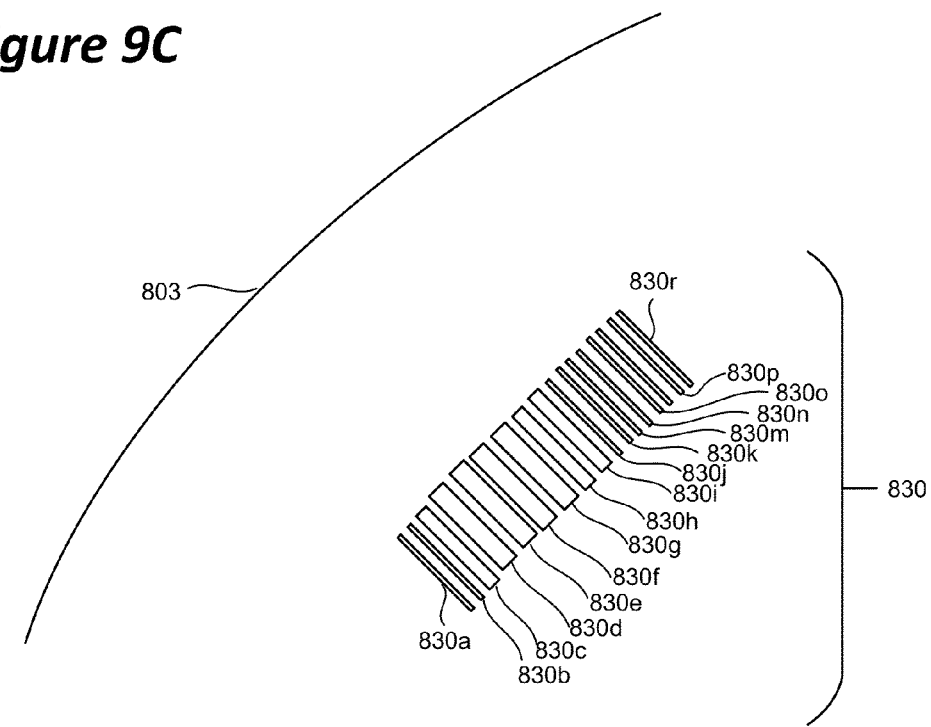
FIG. 9C is a block diagram that depicts a reflector and feed horns.

FIG. 9C depicts reflector 803 and feed horns 830. In one embodiment, feed horns 830 include feed horns 830*a*, 830*b*, 830*c*, 830*d*, 830*e*, 830*f*, 830*g*, 830*h*, 830*i*, 830*j*, 830*k*, 830*m*, 830*n*, 830*o*, 830*p*, 830*q*, and 830*r*. Feed horns 830*a*, 830*b*, 830*i*, 830*j*, 830*k*, 830*m*, 830*n*, 830*o*, 830*p*, 830*q*, and 830*r* are used to implement large spot beams. Feed horns 830*d*, 830*e*, 830*f* and 830*g* are used to implement small spot beams. Feed horns 830*c*, 830*h* and 830*i* are used to implement intermediate sized spot beams. When transmitting, the feed horns 830 bounce their signal off reflector 803 and down to the ground. When receiving, signals from the ground are bounced off of reflector 803 into the feed horns 830. In one embodiment, all of the spot beams implemented by feed horns 830 communicate in the same color.

Figure 9D:
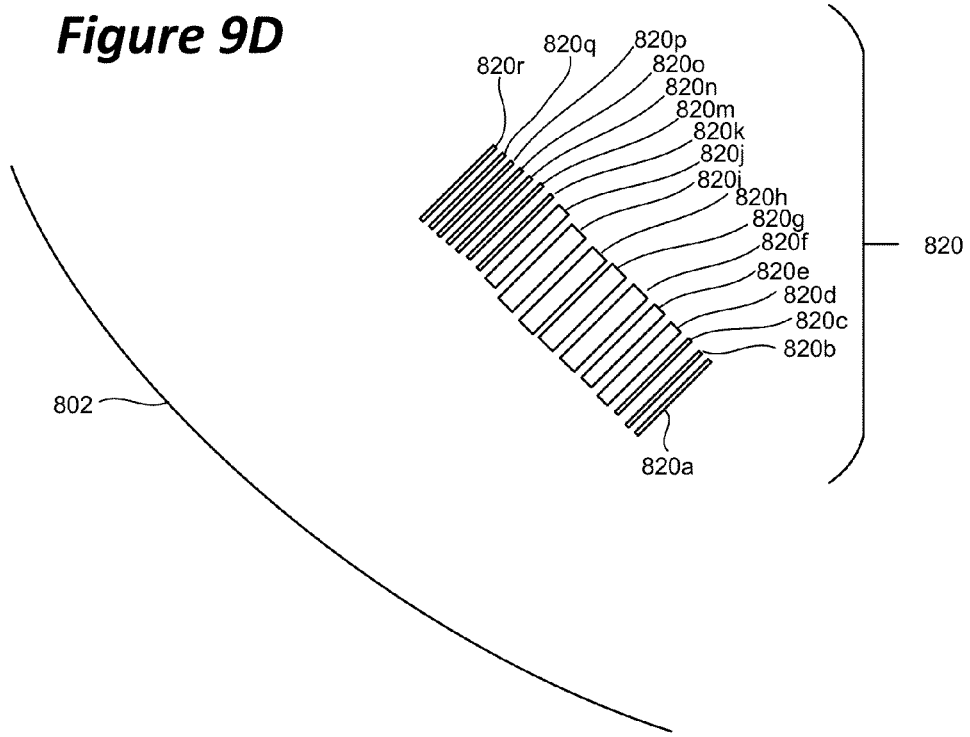
FIG. 9D is a block diagram that depicts a reflector and feed horns.

FIG. 9D depicts reflector 802 and feed horns 820. In one embodiment, feed horns 820 include feed horns 820*a*, 820*b*, 820*c*, 820*d*, 820*e*, 820*f*, 820*g*, 820*h*, 820*i*, 820*j*, 820*k*, 820*m*, 820*n*, 820*o*, 820*p*, 820*q*, 820*r* and 820*s*. Feed horns 820*a*, 820*b*, 820*c*, 820*k*, 820*m*, 820*n*, 820*o*, 820*p*, 820*q*, and 820*r* are used to implement large spot beams. Feed horns 820*f*, 820*g*, 820*h* and 820*i* are used to implement small spot beams. Feed horns 820*d*, 820*e* and 820*i* are used to implement intermediate sized spot beams. When transmitting, the feed horns 820 bounce their signal off reflector 802 and down to the ground. When receiving, signals from the ground are bounced off of reflector 802 into the feed horns 820. In one embodiment, all of the spot beams implemented by feed horns 820 communicate in the same color.

The flexible tailored architecture described above can be designed to accommodate arbitrary demand maps across contiguous coverage areas. For example, FIG. 10 is a flow chart describing one example process of manufacturing a satellite that uses the technology described above. Step 902 includes identifying high demand regions in a coverage area. Step 904 includes identifying low demand regions in the coverage area. In some embodiments, either one or both of step 902 or 904 can be skipped. In step 906, the size of a small spot beam is determined for the high demand regions. The size of the spot beam can be determined based on spectral efficiency, power, population density, etc. In step 908, the size of the large spot beams are calculated as a function of the size of the small spot beams and the scaling is determined by the antenna performance. For example, for a certain size reflector dish antenna, the range of realizable spot beam sizes can be simulated by electromagnetic simulation software. In one embodiment, to enable all three sizes of spot beams on the same aperture (or set of apertures), the diameter of a large spot beam should be no more than 1.5 times the diameter of the small spot beam for a four color frequency reuse system. That is, ratio of the beam size for the large spot beam to the beam size of the small spot beam should be no more than 1.5:1. In step 910, the size of the transition beams (the intermediate size beams) are calculated based on the size of the small beam and/or the size of the large beam. In one embodiment, the intermediate size beams are halfway between the size of the small beams and the large beams. That is, the size of the intermediate size beams can be the average of the beam size of the small spot beam and the average size of the large spot beam. Other intermediate sizes can also be used. In an embodiment that uses three color frequency reuse, the diameter of the large spot beam should be no more than 1.5 times the diameter of the small spot beam. That is, for three color frequency use, the ratio of the beam size for the large spot beam to the small spot beam should be no more than 1.5:1. The maximum beam size difference is determined by the antenna reflector design, not the frequency re-use. For a certain size dish, it can only accommodate a range of beam sizes before the beam distortion sets in. Distortion means beam shape distortion from round to elongated ones due to non-ideal projection.

In step 912, the small spot beams are placed in the beam map over the high demand regions of the coverage area. In step 914, the large spot beams are placed in the beam map over the low demand regions of the coverage area, as well as other regions of the coverage area that are not in the high demand regions. In step 916, the transition beams are placed in transition regions in the beam map, such as regions between where the small spot beams are placed and where the large spot beams are placed. In step 918, the reflector and the feed horns are designed to implement the small, large and intermediate size spot beams. In step 920, the signal path components (see e.g. FIGS. 4 and 5) are designed. In step 922, the satellite is manufactured as per the details of steps 902-920. In step 924, the satellite is deployed for operation.

Figure 11:
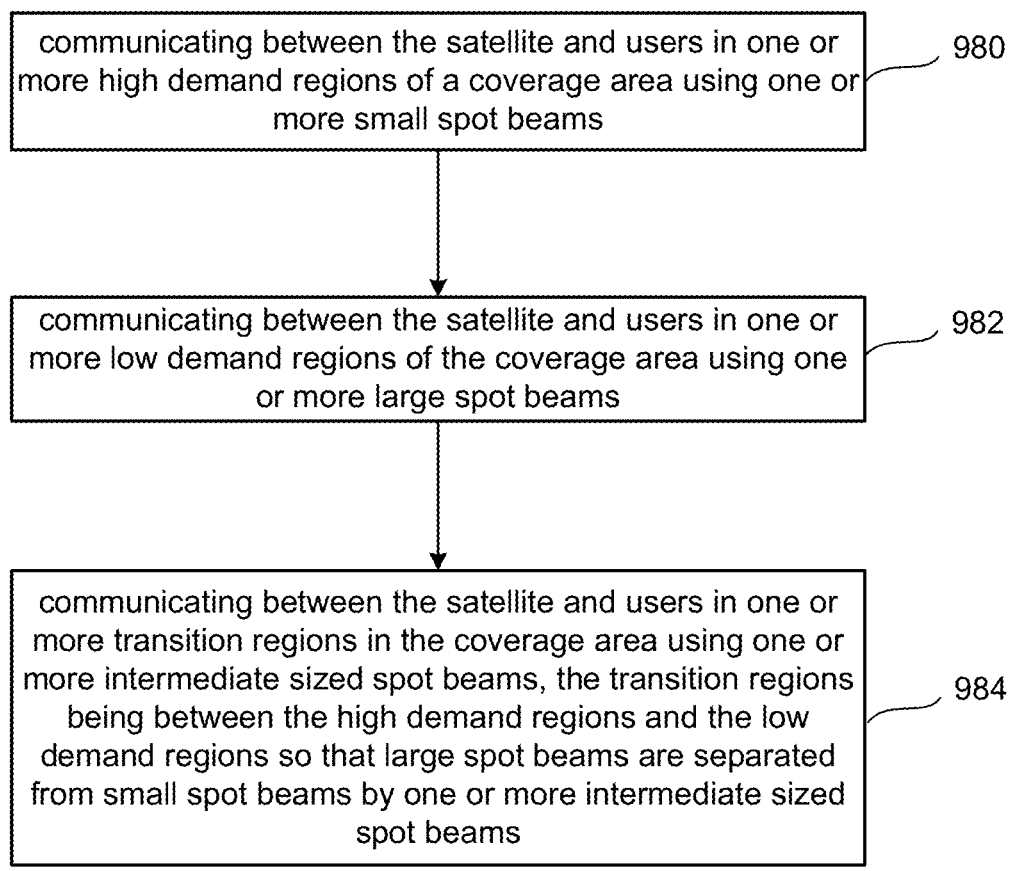
FIG. 11 is a flow chart describing one embodiment of a process for operating a satellite.

FIG. 11 is a flow chart describing one embodiment for operating a satellite (or other communication platform), as per the technology described herein. In step 980, the satellite is providing communication between the satellite and users in one or more high demand (e.g., high population density) regions of a coverage area using one or more small spot beams. In step 982, the satellite is providing communication between the satellite and users in one or more low demand (e.g., low population density) regions of the coverage area using one or more large spot beams. In step 984, the satellite is providing communication between the satellite and users in one or more transition regions in the coverage area using one or more intermediate sized spot beams. The transition regions are located between the high demand regions and the low demand regions so that large spot beams are separated from small spot beams by one or more intermediate sized spot beams. As described above, the large spot beams are created to have a beam width that is a function of a beam width of the small spot beams. The three steps of communicating 980, 982, and 984 are performed concurrently and provide continuous communication coverage over the coverage area.

Although the main example described above includes a satellite, the technology described herein can be used with other communication platforms, such as a UAV, balloon, airplane, helicopter, a dedicated terrestrial antenna, etc.

One embodiment includes a satellite, comprising: a power source; and an antenna system configured to provide a plurality of spot beams including one or more small spot beams illuminating a first region of a coverage area, one or more large spot beams illuminating a second region of the coverage area separate from the first region and one or more intermediate sized spot beams illuminating a third region of the coverage area that is located between the first region and the second region so that the one or more small spot beams are separated from the one or more large spot beams by the one or more intermediate sized spot beams.

One embodiment includes a satellite, comprising: a first aperture configured to provide a first plurality of spot beams including a first small spot beam illuminating a first portion of a first region of a coverage area, a first large spot beam illuminating a first portion of a second region of the coverage area and an first intermediate sized spot beams illuminating a first portion of a third region of the coverage area that is located between the first region and the second region; and a second aperture configured to provide a second plurality of spot beams including a second small spot beam illuminating a second portion of the first region of the coverage area, a second large spot beam illuminating a second portion of the second region of the coverage area and a second intermediate sized spot beam illuminating a second portion of the third region of the coverage area.

One embodiment includes a method of operating a satellite, comprising: communicating between the satellite and users in a first region of a coverage area using a small spot beam; communicating between the satellite and users in a second region of the coverage area using a large spot beam; and communicating between the satellite and users in a third region of a coverage area using an intermediate sized spot beam, the third region is between the first region and the second region so that the small spot beam is separated from the large spot beam by at least the intermediate sized spot beam.

One embodiment includes a method for manufacturing a satellite, comprising: identifying one or more high demand regions of a coverage area; locating one or more small spot beams over the high demand regions; locating one or more large spot beams over regions of the coverage area that are not high demand regions; locating one or more intermediate sized spot beams between the one or more small spot beams and the one or more large spot beams; designing a satellite to implement the located small spot beams, intermediate sized spot beams and large spot beams; and building the satellite with the small spot beams, intermediate sized spot beams and large spot beams.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A satellite, comprising:
   a power source; and
   an antenna system configured to provide a plurality of spot beams that provide continuous coverage of a coverage area, the plurality of spot beams including:
      one or more small spot beams illuminating a first region of the coverage area;
      one or more large spot beams illuminating a second region of the coverage area separate from the first region; and
      one or more intermediate sized spot beams illuminating a third region of the coverage area,
      wherein the small spot beams do not illuminate either of the second region or the third region, the large spot beams do not illuminate either the first region or the third region, and the intermediate sized spot beams do not illuminate either the first region or the second region, and
      wherein the third region is located between the first region and the second region so that the first region is separated from the second region by the third region so that the one or more intermediate sized spot beams serve to mitigate C/I for the one or more small spot beams.

2. The satellite of claim 1, wherein:
   the one or more large spot beams have a beam size that is a function of a beam size of the one or more small spot beams.

3. The satellite of claim 1, wherein:
   the one or more large spot beams have a first beam size, the one or more small spot beams have a second beam size, the ratio of the first beam size to the second beam size is no more than 1.5.

4. The satellite of claim 3, wherein:
   the plurality of spot beams operate using three color frequency reuse.

5. The satellite of claim 1, wherein:
the plurality of beams operate using four color reuse; and
the plurality of beams include at least one small spot beam communicating in each color of the four color reuse, one large spot beam communicating in each color of the four color reuse, and one intermediate size spot beam communicating in each color of the four color reuse.

6. The satellite of claim 1, wherein:
antenna system includes multiple reflectors; and
each reflector of the multiple reflectors communicates at least one small spot beam, at least one large spot beam and at least one intermediate sized spot beam.

7. The satellite of claim 6, wherein:
the plurality of beams employ multiple color reuse; and
each reflector communicates using one color.

8. A satellite, comprising:
a first aperture configured to provide a first plurality of spot beams including a first small spot beam illuminating a first portion of a first region of a coverage area, a first large spot beam illuminating a first portion of a second region of the coverage area and a first intermediate sized spot beams illuminating a first portion of a third region of the coverage area that is located between the first region and the second region; and
a second aperture configured to provide a second plurality of spot beams including a second small spot beam illuminating a second portion of the first region of the coverage area, a second large spot beam illuminating a second portion of the second region of the coverage area and a second intermediate sized spot beam illuminating a second portion of the third region of the coverage area, whereby the small spot beams are separated from the large spot beams by the intermediate spot beams so that the intermediate sized spot beams serve to mitigate C/I for the small spot beams.

9. The satellite of claim 8, wherein:
the first large spot beam has a beam size that is a function of a beam size of the first small spot beam.

10. The satellite of claim 8, wherein:
the satellite employs multiple color reuse;
all spot beams for the first aperture use a first color; and
all spot beams for the second aperture use a second color.

11. The satellite of claim 8, further comprising:
a third aperture configured to provide a third plurality of spot beams including a third small spot beam illuminating a third portion of the first region of the coverage area, a third large spot beam illuminating a third portion of the second region of the coverage area and a third intermediate sized spot beam illuminating a third portion of the third region of the coverage area; and
a fourth aperture configured to provide a fourth plurality of spot beams including a fourth small spot beam illuminating a fourth portion of the first region of the coverage area, a fourth large spot beam illuminating a fourth portion of the second region of the coverage area and a fourth intermediate sized spot beam illuminating a fourth portion of the third region of the coverage area;
the satellite employs four color reuse, all spot beams for the first aperture use a first color, all spot beams for the second aperture use a second color, all spot beams for the third aperture use a third color and all spot beams for the fourth aperture use a fourth color.

12. A method of operating a satellite, comprising:
providing continuous communication coverage over a coverage area, including:
communicating between the satellite and users in a first region of the coverage area using one or more small spot beams;
communicating between the satellite and users in a second region of the coverage area using one or more large spot beams; and
communicating between the satellite and users in a third region of a coverage area using one or more intermediate sized spot beams, wherein communicating between the satellite and the users does not use either of the large spot beams or the intermediate sized spot beams in the first region, does not use either of the small spot beams or the intermediate sized spot beams in the second region, and does not use either of the small spot beams or the large spot beams in the third region, and wherein the third region is between the first region and the second region so that the one or more small spot beams are separated from the one or more large spot beams by at least the one or more intermediate sized spot beams so that the one or more intermediate sized spot beams serve to mitigate C/I for the one or more small spot beams.

13. The method of claim 12, wherein:
the communicating between the satellite and users in the second region of the coverage area comprises creating the large spot beam to have a beam width that is a function of a beam width of the small spot beam.

14. The method of claim 12, wherein:
the first region has a high population density; and
the second region has a lower population density than the first region.

15. A method for manufacturing a satellite, comprising:
identifying one or more high demand regions of a coverage area;
locating one or more small spot beams over the high demand regions;
locating one or more large spot beams over regions of the coverage area that are not high demand regions;
locating one or more intermediate sized spot beams between the one or more small spot beams and the one or more large spot beams, wherein the small spot beams, intermediate sized spot beams and large spot beams provide continuous coverage over the coverage area such that the small spot beams are separated from the large spot beams by the intermediate spot beams so that the intermediate sized spot beams serve to mitigate C/I for the small spot beams;
designing a satellite to implement the located small spot beams, intermediate sized spot beams and large spot beams; and
building the satellite, the satellite having a power source and an antenna system configured to provide the small spot beams, intermediate sized spot beams and large spot beams.

16. The method of claim 15, further comprising:
determining a size of the small spot beams; and
determining a size of the large spot beams to be a factor of no more than 1.5 of the size of the small spot beams.

* * * * *